C. R. Fox,
Circular Saw Mill
No. 271.
Reissued July 18, 1854.
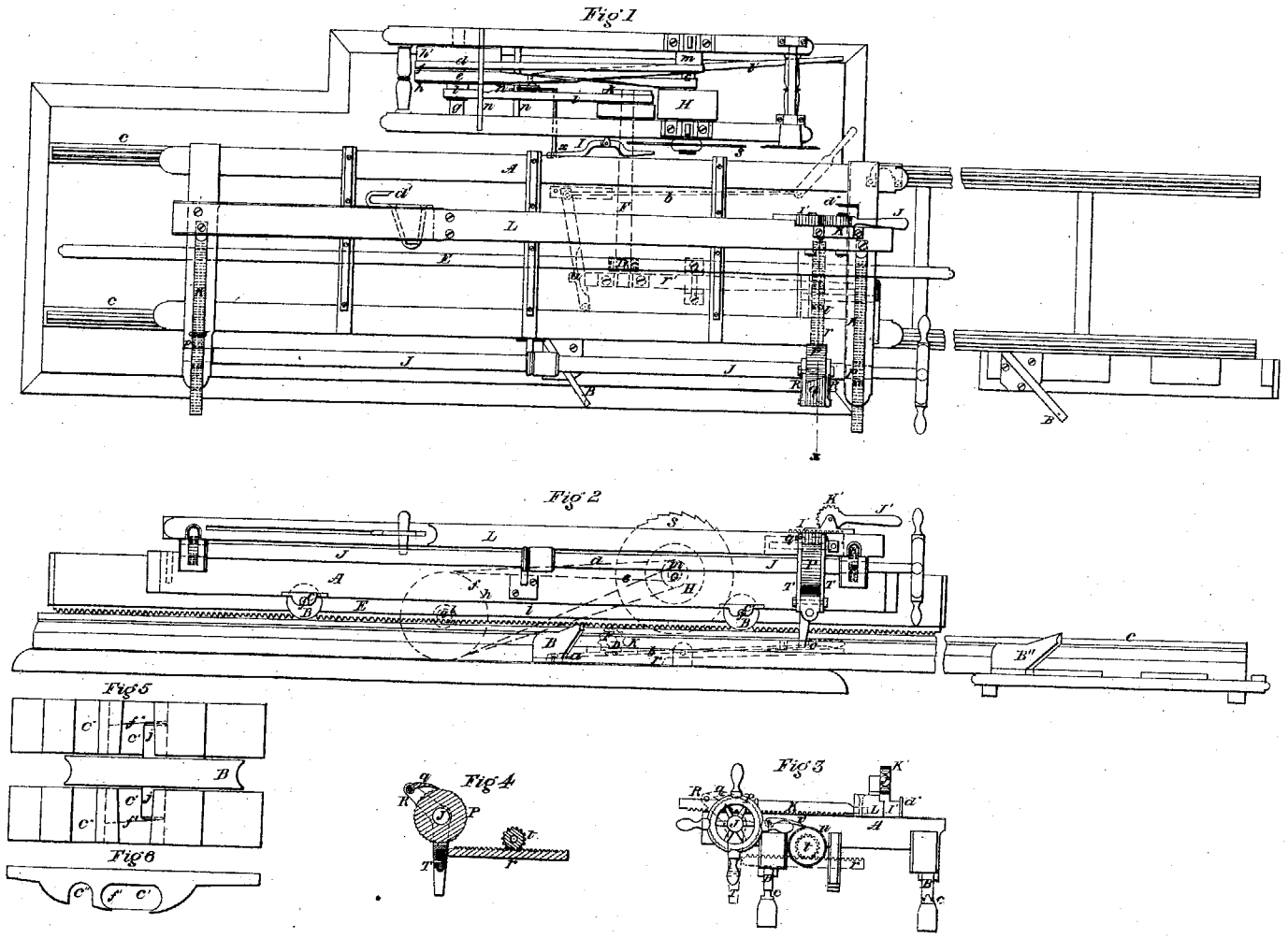
AM. PHOTO-LITHO. CO. N.Y. (OSBORNE'S PROCESS)

UNITED STATES PATENT OFFICE.

CHARLES R. FOX, OF CHICAGO, ILLINOIS.

IMPROVED SAWING-MACHINE.

Specification forming part of Letters Patent No. 10,888, dated May 9, 1854; Reissue No. 271, dated July 18, 1854.

*To all whom it may concern:*

Be it known that I, CHARLES R. FOX, of Chicago, in the county of Cook and State of Illinois, have invented a new and useful Improvement in Saw-Mills; and I do hereby declare that the following is a full, clear, and exact description of the construction and operation of the same, reference being had to the annexed drawings, forming part of this specification, in which—

Figure 1 is a plan of the saw-mill. Fig. 2 is a side elevation of the same. Fig. 3 is an end elevation of the carriage. Fig. 4 is a vertical section on line *x x*, Fig. 1. Fig. 5 is a plan of carriage-boxes inverted. Fig. 6 is a side elevation of carriage-boxes.

Similar characters of reference denote the same part of the machine.

The object of my invention is to furnish the means of giving any desired set to the log, and also to furnish a sure and simple set-off for the carriage when gigging back, and a set up when moving forward.

The first portion of the invention consists in the employment of a pair of arms movable around the feed-rod, the lower arm jointed to accommodate the back motion of the carriage, and the upper arm carrying a sectional pawl with an oblique edge, so that some one of the sections will always catch in the ratchet moving the feed-rod, the position of the lower arm being dependent upon the protrusion of a regulating-rack, against which the said arm rests, the advance or recedence of which rack determines the extent of surface of an inclined stud to be passed over by the lower arm, and consequently the amount of movement given to the ratchet revolving the feed-rod.

The second part of my invention consists in placing under the carriage for the reception of the rollers carrying the same boxes having inclined interior faces and otherwise constructed, as will be hereinafter specified, for giving the carriage a lateral movement at the backward and forward motion of the same, sufficient to gear the saw in gigging back, and insure a proper position for receiving the cut when moving forward, this mill being so constructed as to cut by both forward and backward motion, or, if desired, to cut at the forward movement only, and gig back for the succeeding cut, this last being the occasion for the employment of the second part of the invention.

To enable others skilled in the art to make and use my invention, I will proceed to describe its construction and operation.

In the drawings, A is the frame of the carriage, and B the wheels, movable upon the rails C by reason of the rack E on the bottom of the carriage meshing into the pinion D on the shaft F, this pinion being raised and lowered, and thrown in and out of gear by means of the wedge-lever *a*, rod *b*, and lever *c*. The saw S is secured upon the shaft G in the usual manner, and is driven by a band passed around the pulley H, and a wheel connected with an engine or other power. This shaft G gives motion to the shaft F by reason of the band *d* or *e* connecting said shaft G with the pulley *f*. This pulley is fixed to the shaft *g*, and has on each side the loose pulleys *h* and *h'*, for the reception of one of the bands *d* and *e* when the other is in operation. One of these bands, *d*, is straight, and the other, *e*, is crossed, so that the rotation of the shaft *g*, produced by the bands, is in contrary directions, the crossed band giving the forward motion to the carriage through the band *i*, over the pulleys *k* and *l*, and the straight band giving the backward motion. These bands *d* and *e* both run over the shaft *g* when the machine is designed to cut at both forward and backward movements of the carriage, giving the same velocity to both movements; but when the cut is made in the forward direction only, a pulley, *m*, is secured on the shaft G, and the straight band passed over it, so as to increase the velocity of the carriage when gigging back. The bands *d* and *e* pass through the slide *n*, which is moved longitudinally by reason of its connection with the lever I, acted upon by studs of the carriage, as will be hereinafter set forth, this movement of the slide *n* causing one of the bands *d* or *e* to pass from the fixed pulley *f* to one of the loose pulleys, and the other band to pass from a loose pulley to a pulley, *f*, according to the direction of said motion of the slide, producing an immediate reverse of motion in the carriage from the same rotation of the shaft G, and this without any stoppage to the carriage, or the employment of a bunting-post or any of the usual devices for the production of such reverse motion. On the outer side of the carriage is the feed-rod J, having on its extremities the pinions *p*, meshing into the racks K, attached to the head-blocks L, so that the revolution of the rod J gives the lateral motion to the said block, which produces the feed of the log, and it is in manner of giving the requisite amount of revolution to this rod that the first portion of my invention consists. Upon the rod J is the ratchet-wheel P, embracing which and movable around the rod J are the arms R and T, the former containing the sectional pawl *q*, the oblique edge of which rests upon the ratchet P, and the latter jointed so as to fold under the carriage when meeting any obstruction during the backward movement of the same, but incapable of yielding during the forward motion, causing, therefore, when meeting the inclined studs B′ B″, an outward and upward movement of said arm T, and a consequent rotation of the ratchet P by the pressure of one of the sections of the pawl *q* in some one of the notches of the wheel. The amplitude of this upward and outward movement of the arm T is governed by the extent of the surface of the stud to be passed over, which will be greater or less in proportion to the distance of the arm T from the side of the carriage at the time of striking the stud. This adjustment is regulated by the position of the rack *r*, against the end of which the arm T rests, the rack meshing into the pinion *t*, and being moved by the revolution of the plate *u*, having on its edge notches for the reception of the pawl *v*, the spaces between which are graduated to the various distances it may be desired to move the head-block for giving the log any required feed. The inclined studs are placed in the proper positions for giving the feed during the forward movement of the carriage, the forward one, B″, being movable to accommodate the several lengths of logs, and being entirely removed when the mill is adjusted for sawing by the forward motion of the carriage only. The studs on the inner side of the carriage strike the lever I and operate the slide, as will be hereinafter set forth. The log is held between the dogs *d′ d″*, one, *d′*, secured to the head-block L, and the other attached to the rack I′, and movable longitudinally by the lever J′ through the pinion K′.

The operation of my improved saw-mill is as follows: The log is first secured between the dogs *d′* and *d″*, as above described, and the bands *d* and *e* arranged for either the single cut of the saw or for the cut by both backward and forward motions of the carriage, the stud B″ being in the former case removed, and in latter case placed so as to accommodate the length of log, to which the requisite set is given for the first cut, the plate *u* being turned so that the same thickness shall be produced by the revolution of the feed-rod for the succeeding cut. Motion is then communicated to the shaft G, causing, as above described, the forward motion of the carriage and the completion of the first cut. If the machine be set to cut by the back movement of the carriage, the arm T strikes the stud B″ after the completion of the forward cut, revolving the feed-rod and setting up the log, when the rear stud on the inner side of the carriage, striking the lever I, shifts the band *d* to the wheel *f*, and throws off the band *e* to the loose wheel *h*, producing an immediate reverse of motions, and a cutting of a board by the backward movement of the carriage. As the back cut is completed, the forward stud on the inner side of the carriage strikes the arm *x* of the lever I, producing the reverse positions of the bands *d* and *e* from that just described, and a consequent change in the direction of the carriage, the arm T producing the set of the log as it meets the stud B′ in its forward movement. In this way the mill continues operating until the log is sawed up. If it be desired to cut at the forward movement of the carriage only, the journals of the wheels B are set in the boxes C′, (shown in Figs. 5 and 6,) and as they move forward they run up the inclined plane *f′*, and set the carriage up for the cut, while on the return for gigging back, the journals run into the opposite extremity of the box, and pressing against the inclined plane *f″*, move the carriage sufficiently from the saw so admit of the carriage running rapidly back without interference with the saw. In this latter case the stud B″ is removed and the pulley *m* placed on the shaft G, for the reasons above set forth. The boxes C′, in which the second part of the invention consists, may be considered as self-acting, the inclined inner faces moving the carriage over the journals, so that the proper lateral movement of the carriage is produced by the backward and forward action of the same. The plain boxes C″ are to be used when the cut is made by both movements of the carriage. If the operator should desire to reverse the motion of the carriage, the lever *l′* will move the slide *n*, and by the action of the lever *c* the carriage can be instantly stopped, the pinion D dropping clear of the rack. The notches on the plate *u* are cut for different thicknesses of stuff, and can be made with any required degree of accuracy, as the sectional pawl *q* will secure the ratchet for the slightest movement of said plate. This arrangement therefore admits of the greatest accuracy in the feed of the log, insuring the cutting of stuff of any desired thickness. The sides of the boxes C′ are movable, so that when the wear upon them by the action of the journals *j* prevents their effective operation they may be removed and new side pieces inserted.

What I claim as my invention, and desire to secure by Letters Patent, is—

1. The combination of the notched plate *u*, pawl *v*, rack *r*, pinion *t*, lever R T, and sectional pawl $q$, arranged and operating substantially as and for the purposes hereinbefore set forth.

2. The construction of the boxes C′ with the opposite inclined inner faces, $f'$ $f''$, for giving the requisite set-off to the carriage when gigging back, and again setting up when moving forward for the cut, substantially as herein fully set forth.

In testimony whereof I have hereunto signed my name before two subscribing witnesses.

CHARLES R. FOX.

Witnesses:
SAML. GRUBB,
GEO. PATTEN.